United States Patent
Bai

(10) Patent No.: US 10,365,951 B2
(45) Date of Patent: Jul. 30, 2019

(54) HOT APPLICATION RESOURCE ALLOCATION METHOD, MOBILE TERMINAL AND STORAGE MEDIUM

(71) Applicant: GUANGDONG OPPO MOBILE TELECOMMUNICATIONS CORP., LTD., Dongguan, Guangdong (CN)

(72) Inventor: Jian Bai, Dongguan (CN)

(73) Assignee: GUANGDONG OPPO MOBILE TELECOMMUNICATIONS CORP. LTD., Dongguan (CN)

( * ) Notice: Subject to any disclaimer, the term of this patent is extended or adjusted under 35 U.S.C. 154(b) by 0 days.

(21) Appl. No.: 15/807,880

(22) Filed: Nov. 9, 2017

(65) Prior Publication Data

US 2018/0189107 A1    Jul. 5, 2018

(30) Foreign Application Priority Data

Dec. 30, 2016  (CN) .......................... 2016 1 1263307

(51) Int. Cl.
  *G06F 9/50* (2006.01)
  *G06F 9/48* (2006.01)

(52) U.S. Cl.
  CPC .......... *G06F 9/5027* (2013.01); *G06F 9/4856* (2013.01); *G06F 9/5016* (2013.01); *G06F 9/5038* (2013.01); *G06F 9/5088* (2013.01); *G06F 2209/503* (2013.01); *G06F 2209/506* (2013.01); *G06F 2209/5012* (2013.01); *G06F 2209/5021* (2013.01)

(58) Field of Classification Search
  None
  See application file for complete search history.

(56) References Cited

U.S. PATENT DOCUMENTS

| 2004/0153708 | A1  | 8/2004 | Joshi |
| 2009/0024868 | A1  | 1/2009 | Joshi |
| 2011/0126196 | A1* | 5/2011 | Cheung ................. G06F 9/5077 718/1 |

(Continued)

FOREIGN PATENT DOCUMENTS

| CN | 102479108 A | 5/2012 |
| CN | 103049319 A | 4/2013 |

(Continued)

OTHER PUBLICATIONS

Supplementary European Search Report in European application No. 17200049.9, dated May 8, 2018.

(Continued)

*Primary Examiner* — Wynuel S Aquino
(74) *Attorney, Agent, or Firm* — Ladas & Parry LLP

(57) ABSTRACT

Disclosed is a preset Application (APP) resource allocation method and a mobile terminal. When a preset APP is launched, a dedicated CPU resource and a dedicated memory resource are allocated to the preset APP. It is judged whether a duration of the preset APP running in a background state reaches a preset duration. When the duration of the preset APP running in the background state reaches the preset duration, the dedicated CPU resource and the dedicated memory resource allocated to the preset APP are released, and a common CPU resource and a common memory resource are allocated to the preset APP.

9 Claims, 8 Drawing Sheets

(56) References Cited

U.S. PATENT DOCUMENTS

| | | | |
|---|---|---|---|
| 2014/0317634 A1 | 10/2014 | Ishikawa et al. | |
| 2015/0277971 A1 | 10/2015 | Youug et al. | |
| 2015/0301864 A1* | 10/2015 | Tseng .................... | G06F 9/5011 718/104 |
| 2015/0347184 A1 | 12/2015 | Kim et al. | |
| 2017/0371509 A1* | 12/2017 | Jung ................... | G06F 3/04817 |

FOREIGN PATENT DOCUMENTS

| | | |
|---|---|---|
| CN | 103294553 A | 9/2013 |
| CN | 105700930 A | 6/2016 |
| CN | 105867590 A | 8/2016 |
| CN | 106155777 A | 11/2016 |
| EP | 2958019 A1 | 12/2015 |
| WO | 2009057208 A1 | 5/2009 |

OTHER PUBLICATIONS

International Search Report in international application No. PCT/CN2017/115746, dated Mar. 7, 2018.

English Translation of the Written Opinion of the International Search Authority in international application No. PCT/CN2017/115746, dated Mar. 7, 2018.

\* cited by examiner

HOT APPLICATION RESOURCE ALLOCATION METHOD, MOBILE TERMINAL AND STORAGE MEDIUM

CROSS-REFERENCE TO RELATED APPLICATIONS

This application claims priority to Chinese Patent Application No. 201611263307.6 filed on Dec. 30, 2016, the disclosure of which is incorporated by reference herein in its entirety.

TECHNICAL FIELD

The disclosure relates to the technical field of mobile terminals, and in particular to a hot Application (APP) resource allocation method and a mobile terminal.

BACKGROUND

When a user uses a mobile terminal such as a mobile phone or a tablet computer, the CPU resources and memory resources of the mobile terminal may be insufficient due to limited Central Processing Unit (CPU) resources and memory resources of the mobile terminal if a large number of applications (APPs) are running in the mobile terminal, thereby causing bad use experiences of the APPs. In the related art, in order to ensure use experiences of some hot APPs, dedicated CPU resources and memory resources may be allocated to the hot APPs in the mobile terminal. As long as hot APPs are running, dedicated CPU resources and memory resources are allocated to the hot APPs. If the hot APPs in the mobile terminal keep running, the limited CPU resources and memory resources are always occupied.

SUMMARY

According to a first aspect of the embodiments of the disclosure, a preset APP resource allocation method is provided. The method includes operations as follows. When a preset APP is launched, a dedicated Central Processing Unit (CPU) resource and a dedicated memory resource are allocated to the preset APP. It is judged whether a duration of the preset APP running in a background state reaches a preset duration. When the duration of the preset APP running in the background state reaches the preset duration, the dedicated CPU resource and the dedicated memory resource allocated to the preset APP are released, and a common CPU resource and a common memory resource are allocated to the preset APP.

According to a second aspect of the embodiments of the disclosure, a mobile terminal is provided. The mobile terminal includes: a processor, a memory and a communication interface, the processor being connected to the memory and the communication interface, wherein the memory stores executable program codes, and the communication interface is used for wireless communication; and the processor is configured to call the executable program codes in the memory to execute the method described in the first aspect of the embodiments of the disclosure.

According to a third aspect of the embodiments of the disclosure, a non-transitory computer readable storage medium is provided, having stored therein, executable program codes, which, when executed by a processor, cause the processor to execute the method described in the first aspect of the embodiments of the disclosure.

BRIEF DESCRIPTION OF DRAWINGS

In order to more clearly illustrate the technical solutions in the embodiments of the disclosure or the related art, accompanying drawings to be used in the descriptions of the embodiments or the related art will be simply introduced herein below. Obviously, the drawings described hereinbelow are merely some embodiments of the disclosure. A person of ordinary skill in the art may obtain other drawings according to these drawings without creative work.

DETAILED DESCRIPTION

Figure 1:
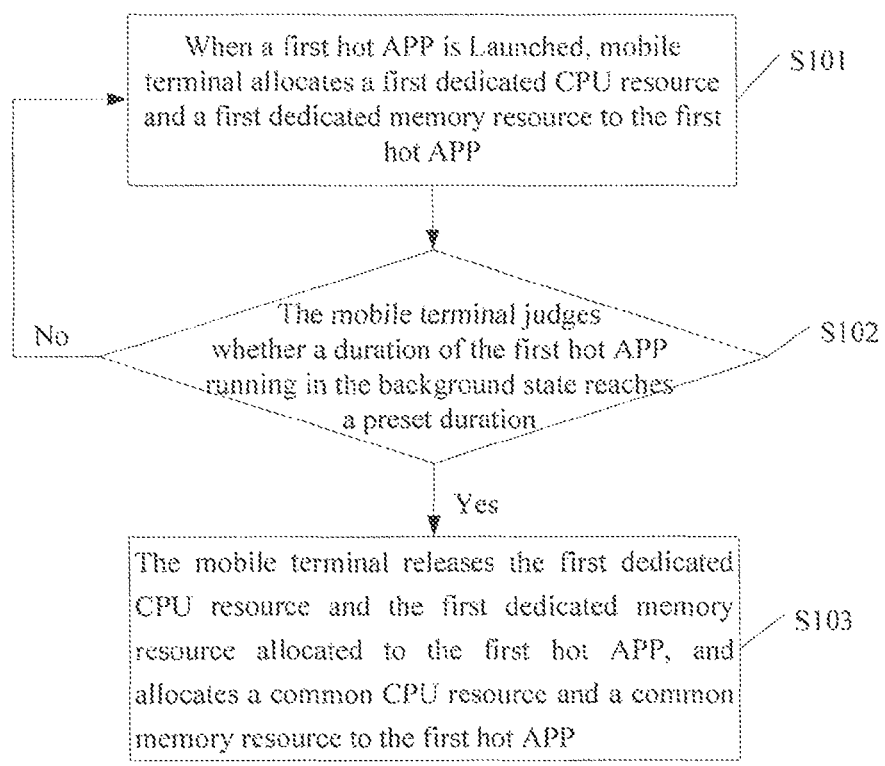
FIG. 1 illustrates a flowchart of a hot APP resource allocation method according to an embodiment of the disclosure.

In order to make a person skilled in the art better understand the solutions of the disclosure, the technical solutions in the embodiments of the disclosure will be clearly and completely described hereinbelow with reference to the drawings in the embodiments of the disclosure. Obviously, the described embodiments are only a part of the embodiments of the disclosure, not all of the embodiments. Based on the embodiments of the disclosure, all other embodiments obtained on the premise of no creative work of a person skilled in the art should fell within the scope of protection of the disclosure.

The specification and claims of the disclosure and terms "first", "second" and the like in the drawings are used for distinguishing similar objects rather than describing a specific sequence. In addition, terms "include" and "have" and any variations thereof are intended to cover non-exclusive inclusions. For example, processes, methods, systems, products or devices containing a series of operations or units are not limited to operations or units which have been already listed, and other operations or units which are not listed or are inherent to these processes, methods, products or devices are alternatively included instead.

Mentioning of "embodiments" in the disclosure means that specific features, structures or characteristics described in the embodiments may be included in at least one embodiment of the disclosure. The phrase occurring at each position in the specification is not always the same embodiment, or not an independent or alternative embodiment mutually exclusive to other embodiments. A person skilled in the an explicitly and implicitly understands that the embodiments described in the disclosure may be combined with other embodiments.

In addition, a mobile terminal involved in the embodiments of the disclosure may include various handheld devices having a wireless communication function, onboard devices, wearable devices and calculation devices or other processing devices connected to a wireless modem, and various forms of User Equipment (UE), Mobile Stations (MS), terminal devices and the like. For convenience of description, the devices mentioned above are collectively referred to as mobile terminals.

In at least one embodiment of the disclosure, a hot APP resource allocation method is provided. The method includes operations as follows. When a preset APP is launched, a dedicated Central Processing Unit (CPU) resource and a dedicated memory resource are allocated to the preset APP. It is judged whether a duration of the preset APP running in a background state reaches a preset duration. When the duration of the preset APP running in the background state reaches the preset duration, the dedicated CPU resource and the dedicated memory resource allocated to the preset APP are released, and a common CPU resource and a common memory resource are allocated to the preset APP.

In at least one embodiment of the disclosure, a mobile terminal is provided. The mobile terminal includes: a processor, a memory and a communication interface, the processor being connected to the memory and the communication interface, wherein the memory stores executable program codes, and the communication interface is used for wireless communication; and the processor is configured to call the executable program codes in the memory to execute the hot APP resource allocation method as described above.

According to a third aspect of the embodiments of the disclosure, a non-transitory computer readable storage medium is provided, having stored therein, executable program codes, which, when executed by a processor, cause the processor to execute the hot APP resource allocation method as described above.

The embodiments of the disclosure will be introduced in detail hereinbelow.

FIG. 1 illustrates a flowchart of a hot APP resource allocation method according to an embodiment of the disclosure. The hot APP resource allocation method includes the operations in blocks illustrated in FIG. 1. The method can begin at blocks S101.

At block S101, when a first hot APP is launched, a first dedicated CPU resource and a first dedicated memory resource are allocated to the first hot APP. The first hot APP may be any APP in a hot APP set.

In the embodiment of the disclosure, many APPs (here, the APPs are APP programs, referred to as APP for short) such as Wechat, Weibo, Alipay, QQ, E-mail, browser APPs, video APPs and game APPs, may be installed in a mobile terminal. A hot APP may be defined as an APP most likely to be used by a user. The user may preset one or more hot APPs. Specifically, the mobile terminal receives a hot APP selection instruction input by the user, and outputs a visual interactive interface displaying icons of all APPs installed in the mobile terminal; and when receiving a selection instruction for a certain APP, the mobile terminal sets this APP as a hot APP and adds it into a hot APP set. If among icons of all the APPs displayed in the visual interactive interface, there is a certain APP already set as a hot APP, this APP will carry a special mark. When the user clicks this APP, this APP is set as a common APP, and meanwhile, the special mark carried by this APP disappears. Of course, at least one hot APP may be automatically set according to usage habits of the user. For example, it may be judged whether an APP is a hot APP according to a historic cumulative launching count (e.g., a cumulative launching count one or n days ago), a historic cumulative usage duration (e.g., a cumulative usage duration one or n days ago), and user evaluation. Generally speaking, an APP having a larger historic cumulative launching count, a longer historic cumulative usage duration and higher user evaluation is more likely to be determined as a hot APP.

When a hot APP is launched, a dedicated CPU resource and a dedicated memory resource is allocated to the hot APP. Certain memory resources and CPU resources may be reserved for all hot APPs in the mobile terminal, and are dedicated to the hot APPs. When each hot APP is launched, a dedicated CPU resource and a dedicated memory resource will be allocated to this hot APP. Some hot APPs occupy large memory resources while other hot APPs occupy large CPU resources, and thus memory resources and CPU resources occupied by different not APPs are different from each other. The mobile terminal allocates a dedicated CPU resource and a dedicated memory resource to a hot APP according to the size of an available dedicated memory resource and the size of an available dedicated CPU resource.

For example, the mobile terminal reserves a dedicated memory resource of 1 GigaByte and four dedicated cores. When a first hot APP is launched, the mobile terminal calculates the CPU resource (such as a core) and the memory resource (such as 0.5 GigaByte) required by the first hot APP, and allocates a first dedicated CPU resource (such as a core) and a first dedicated memory resource (such as 0.5 GigaByte) to the first hot APP, so as to ensure that after the first hot APP is launched, there are an available dedicated memory resource and an available dedicated CPU resource. Therefore, the use experience of a hot APP can be improved.

At block S102, the mobile terminal judges whether a duration of the first hot APP running in a background state reaches a preset duration. If so, the operation at block S103 is executed, and otherwise, the operation at block S101 is executed.

At block S103, the mobile terminal releases the first dedicated CPU resource and the first dedicated memory resource allocated to the first hot APP, and allocates a common CPU resource and a common memory resource to the first hot APP.

In the embodiment of the disclosure, when a hot APP is continuously running for a long time in the background, although this hot APP is running, the hot APP still occupies a dedicated CPU resource and a dedicated memory resource. In the embodiment of the disclosure, it is considered that when a hot APP is running in the background state, this hot APP may need to occupy a smaller dedicated CPU resource and a smaller dedicated memory resource, and if a larger dedicated CPU resource and a larger dedicated memory resource are still allocated to the hot APP, the dedicated CPU resource and the dedicated memory resource will be wasted, and thus the dedicated CPU resource and the dedicated memory resource cannot be effectively utilized. Therefore, in the embodiment of the disclosure, it is judged whether a duration of a hot APP running in a background state reaches a preset duration, and when the preset duration is reached, it indicates that a user may not need to use the hot APP. In this case, the dedicated CPU resource and the dedicated memory resource occupied by the hot APP may be released, and a common CPU resource and a common memory resource are allocated to the hot APP. By implementing the embodiment of the disclosure, the precious dedicated CPU resource and dedicated memory resource are occupied as little as possible, so as to be used by an APP which mostly needs to use the dedicated CPU resource and the dedicated memory resource. When the duration of the first hot APP running in the background state does not reach the preset duration, it indicates that the first hot APP is still frequently used. In this case, the dedicated CPU resource and the dedicated memory resource are continued to be allocated to the first hot APP to ensure the use experience of the first hot APP. When the duration of the first hot APP running in the background state reaches the preset duration, it indicates that the first hot APP is already not an APP mostly needed to be used by the user currently. That is, the dedicated CPU resource and the dedicated memory resource occupied by the first hot APP can be released, so that CPU resources and memory resources can be flexibly utilized, thereby improving the utilization efficiency of the CPU resources and the memory resources.

By implementing the method in FIG. 1, CPU resources and memory resources can be flexibly utilized, thereby improving the utilization efficiency of the CPU resources and the memory resources.

Figure 2:
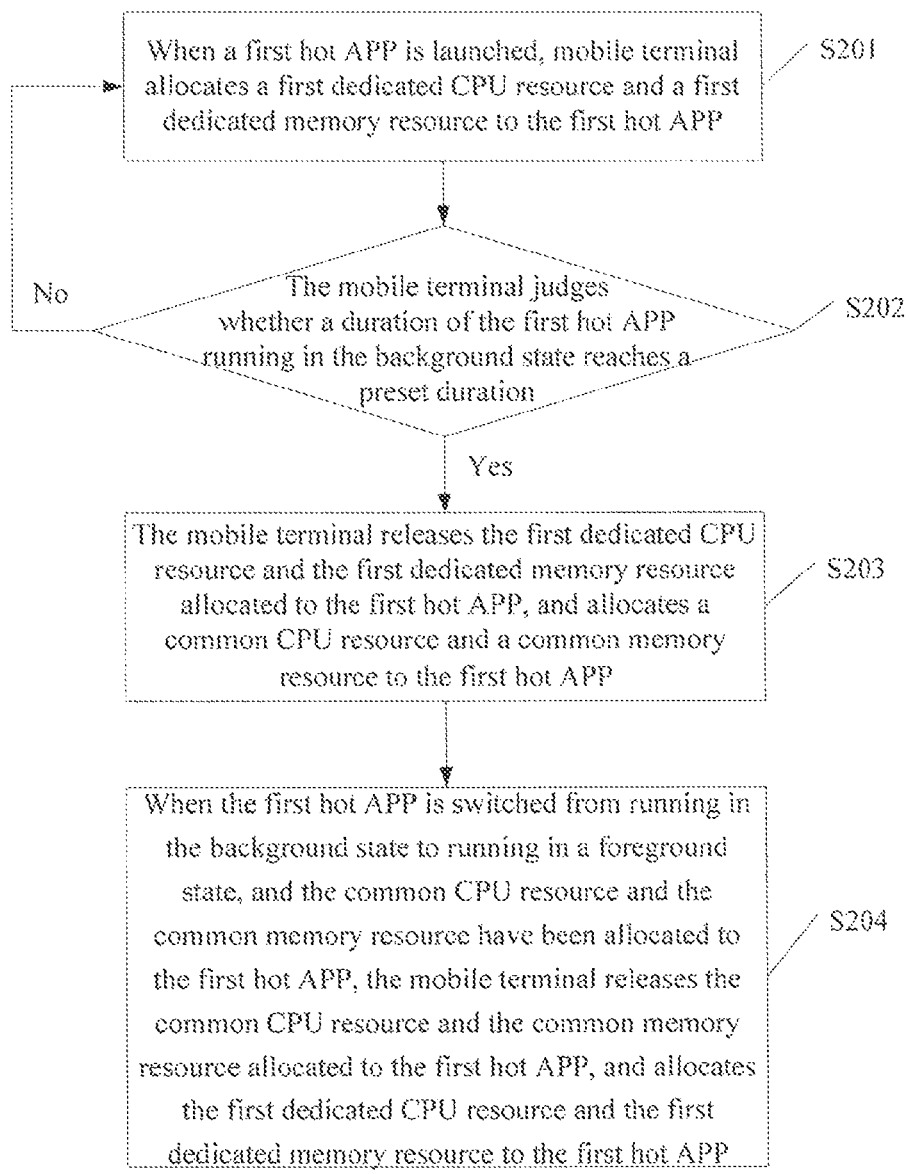
FIG. 2 illustrates a flowchart of another hot APP resource allocation method according to an embodiment of the disclosure.

FIG. 2 illustrates a flowchart of another hot APP resource allocation method according to an embodiment of the disclosure. The hot APP resource allocation method includes operations in blocks illustrated in FIG. 2. The method can begin at block S201.

At block S201, when a first hot APP is launched, the mobile terminal allocates a first dedicated CPU resource and a first dedicated memory resource to the first hot APP. The first hot APP may be any APP in a hot APP set.

At block S202, the mobile terminal judges whether a duration of the first hot APP running in a background state reaches a preset duration. If so, the operation at block S203 is executed, and otherwise, the operation at block S201 is executed.

At block S203, the mobile terminal releases the first dedicated CPU resource and the first dedicated memory resource allocated to the first hot APP, and allocates a common CPU resource and a common memory resource to the first hot APP.

At block S204, when the first hot APP is switched from running in the background state to running in the foreground state, and the common CPU resource and the common memory resource have been allocated to the first hot APP, the mobile terminal releases the common CPU resource and the common memory resource allocated to the first hot APP, and allocates the first dedicated CPU resource and the first dedicated memory resource to the first hot APP.

In the embodiment of the disclosure, when the duration of the first hot APP running in the background state reaches the preset duration, the mobile terminal releases the first CPU resource and the first memory resource allocated to the first hot APP, and allocates the common dedicated CPU resource and the common dedicated memory resource to the first hot APP. When the first hot APP is switched from running in the background state to running in the foreground state, if the common CPU resource and the common memory resource have been allocated to the first hot APP, it indicates that the user starts to use the first hot APP in the foreground. In this case, the mobile terminal releases the common CPU resource and the common memory resource allocated to the first hot APP, and allocates the first dedicated CPU resource and the first dedicated memory resource to the first hot APP. By implementing the embodiments of the disclosure, a dedicated CPU resource and a dedicated memory resource can be still allocated to a hot APP when the hot APP is switched from the background to the foreground, thereby ensuring the use experience of the hot APP.

The operations at blocks S201 to S203 in the embodiment of the disclosure are similar to the operations at blocks S101 to S103 as illustrated in FIG. 1, and will not be elaborated herein.

By implementing the method in FIG. 2, a dedicated CPU resource and a dedicated memory resource can still be allocated to a hot APP when the hot APP is switched from the background to the foreground, thereby ensuring the use experience of the hot APP.

Figure 3:
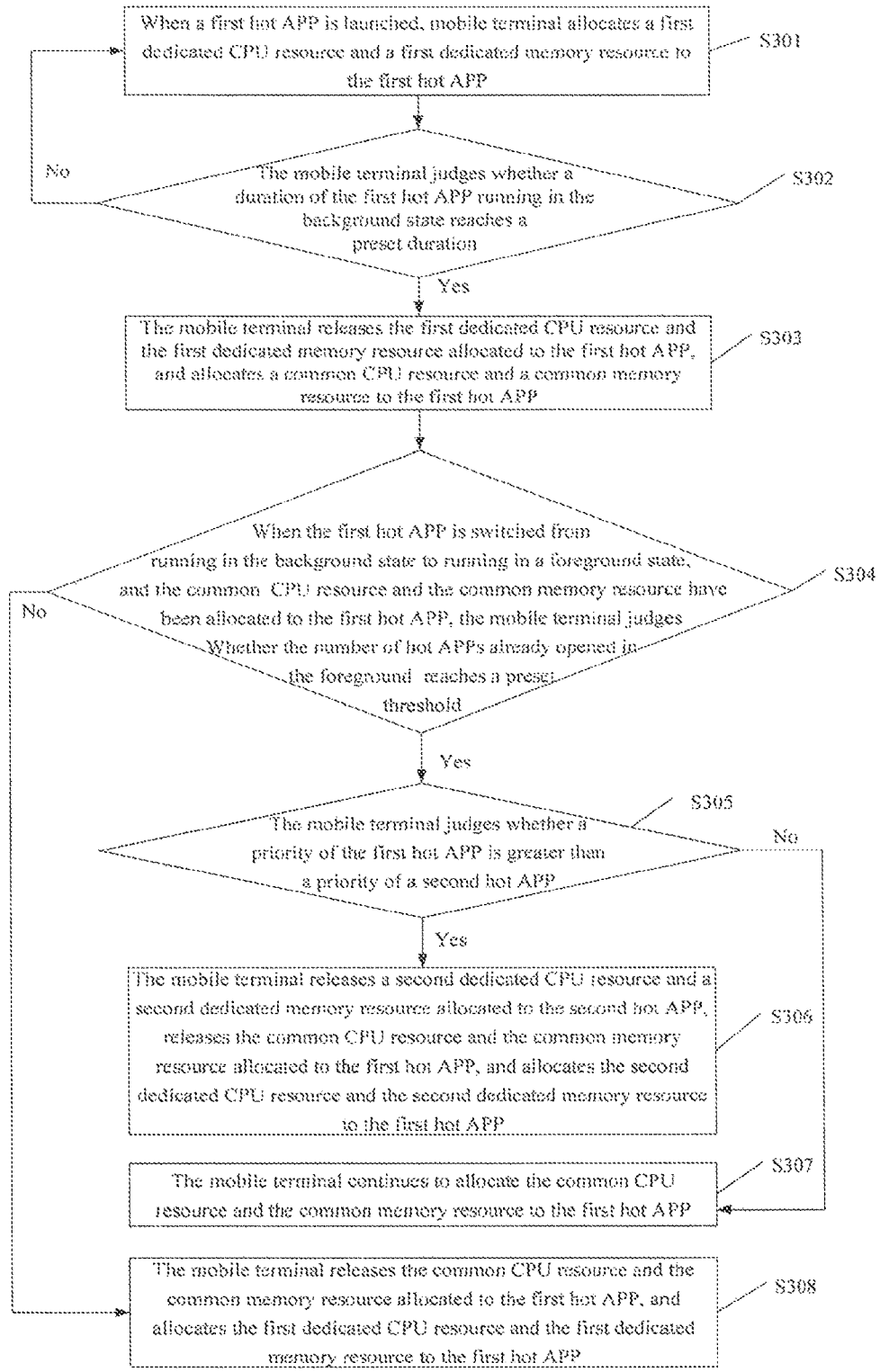
FIG. 3 illustrates a flowchart of another hot APP resource allocation method according to an embodiment of the disclosure.

FIG. 3 illustrates a flowchart of another hot APP resource allocation method according to an embodiment of the disclosure. The hot APP resource allocation method includes operations in blocks illustrated in FIG. 3. The method can begin at block S301.

At block S301, when a first hot APP is launched, a mobile terminal allocates a first dedicated CPU resource and a first dedicated memory resource to the first hot APP. The first hot APP may be any APP in a hot APP set.

At block S302, the mobile terminal judges whether a duration of the first hot APP running in a background state reaches a preset duration. If so, the operation at block S303 is executed, and otherwise, the operation at block S301 is executed.

At block S303, the mobile terminal releases the first dedicated CPU resource and the first dedicated memory resource allocated to the first hot APP, and allocates a common CPU resource and a common memory resource to the first hot APP.

At block S304, when the first hot APP is switched from running in the background state to running in the foreground state, and the common CPU resource and the common memory resource have been allocated to the first hot APP, the mobile terminal judges whether the number of hot APPs running in the foreground state reaches a preset threshold. If so, the operation at block S305 is executed, and otherwise, the operation at block S308 is executed.

In the embodiment of the disclosure, the preset threshold is preset by the mobile terminal. For example, there may be three preset thresholds. The mobile terminal may set the size of the preset threshold according to its own available CPU resource and memory resource. Generally speaking, if the available CPU resource and memory resource of the mobile terminal are larger, the preset threshold may be set to be larger. When the first hot APP is switched from running in the background state to running in the foreground state, if the common CPU resource and the common memory resource have been allocated to the first hot APP, the mobile terminal judges whether the number of hot APPs running in the foreground state reaches a preset threshold. If the preset threshold is reached, the operation at block S305 is executed, and if the preset threshold is not reached, the operation at block S305 is executed.

At block S305, the mobile terminal judges whether a priority of the first hot APP is higher than a priority of a second hot APP. The second hot APP may be any APP in the hot APP set running in the foreground state. If so, the operation at block S306 is executed, and otherwise, the operation at block S307 is executed.

At block S306, the mobile terminal releases a second dedicated CPU resource and a second dedicated memory resource allocated to the second hot APP, releases the common CPU resource and the common memory resource allocated to the first hot APP, and allocates the second dedicated CPU resource and the second dedicated memory resource to the first hot APP.

At block S307, the mobile terminal continues to allocate the common CPU resource and the common memory resource to the first hot APP.

At block S308, the mobile terminal releases the common CPU resource and the common memory resource allocated to the first hot APP, and allocates the first dedicated CPU resource and the first dedicated memory resource to the first hot APP.

In the embodiment of the disclosure, when the mobile terminal judges that the number of hot APPs running in the foreground state reaches a preset threshold, it indicates that dedicated memory resources and dedicated CPU resources occupied by hot APPs running in the foreground state by the mobile terminal reach an upper limit at this time. If a new hot APP (such as a first hot APP) is launched, a new dedicated memory resource and a new dedicated CPU resource cannot be allocated to the first hot APP. In the embodiments of the disclosure, the priority of the first hot APP is compared with the priority of each hot APP running in the foreground state. When the priority of the first hot APP is higher, for example, the priority of the first hot APP is higher than the priority of a certain hot APP (such as a second hot APP) in the hot APPs running in the foreground state, a second dedicated CPU resource and a second dedicated memory resource allocated to the second hot APP are released, and the second dedicated CPU resource and the second dedicated memory resource are allocated to the first hot APP. When the priority of the first hot APP is lower, for example, the priority of the first hot APP is lower than the priorities of all hot APPs in the hot APPs running in the foreground state, a common CPU resource and a common memory resource are allocated to the first hot APP.

Herein, the priority of an APP may be determined by a historic cumulative launching count and a historic cumulative usage duration of the APP; or, the priority of a hot APP may be determined by a user evaluation for the first APP.

The mobile terminal may calculate the priority of a first APP according to the historic cumulative launching count and the historic cumulative usage duration of the first APP. The mobile terminal may calculate the priority of each APP. For example, the mobile terminal may make statistics on a historic (e.g., a cumulative launching count one or n days ago) cumulative launching count and a historic (e.g., a cumulative usage duration one or n days ago) cumulative usage duration of a first APP (the first APP is any one of all APPs installed in the mobile terminal), and may determine the priority of the first APP according to the historic cumulative launching count of the first APP and its corresponding weight, as well as the historic cumulative usage duration and its corresponding weight. If the historic cumulative launching count is 10, the weight corresponding to the historic cumulative launching count is 0.2, the historic cumulative usage duration is 100 hours, and the weight corresponding to the historic cumulative usage duration is 0.8, the priority of the first APP A=10*0.2+100*0.8=82. Generally speaking, if the historic cumulative launching count of the first APP is larger and the historic cumulative usage duration is longer, the priority of the first APP is higher.

The priority of the first APP may also be determined according to user evaluation. A user may make diverse evaluations upon APPs installed in the mobile terminal. For example, the evaluations made upon the APPs by the user may include: grades, star levels, text evaluations and the like. For example, if an average of the grades for the first APP by the user is 5 and the text evaluations include "great", "very good", "very nice", "good use", "very funny" and other keywords, it can be determined that the priority of the first APP is 100; if an average of the grades for the first APP by the user is 4.8 and the text evaluations include "good", "not bad", "easy", "funny" and other keywords, it can be determined that the priority of the first APP is 90; if an average of the grades for the first APP by the user is 4.3 and the text evaluations include "just so-so", "not too bad", "OK" and other keywords, it can be determined that the priority of the first APP is 80; and if an average of the grades for the first APP by the user is 4 and the text evaluations include "just so-so", "not too bad", "OK" and other keywords, it can be determined that the priority of the first APP is 70, and so on.

The operations at blocks S301 to S303 in the embodiment of the disclosure are similar to the operations at blocks S101 to S103 as illustrated in FIG. 1, and will not be elaborated herein.

By implementing the method in FIG. 3, when multiple hot APPs are to be launched, dedicated resources may be allocated to a hot APP having the highest priority, so as to ensure that the use experience of the hot APP having the highest priority is best.

The solutions of the embodiments of the disclosure are introduced above mainly from the perspective of an execution process of a method side. It can be understood that the mobile terminal includes a corresponding hardware structure and/or software module executing each function in order to achieve the abovementioned functions. Those skilled in the art should be easily aware of that the disclosure can be implemented in a form of hardware or a combined form of hardware and computer software in conjunction with units and algorithm operations of each example described in the embodiments disclosed in the disclosure. Whether a certain function is executed in a manner of hardware or a manner of driving hardware through computer software on earth depends on specific applications and design restraint conditions of the technical solutions. Professionals may use different methods for each specific application to achieve the described functions, but this implementation should not be regarded to be beyond the scope of the disclosure.

In the embodiments of the disclosure, function units of a mobile terminal may be divided according to the abovementioned method examples. For example, each function may be divided into all function units correspondingly, and two or more functions may be integrated in a processing unit. The integrated unit may be implemented in a form of hardware, or may be implemented in a form of software function unit. It is to be noted that division of units in the embodiments of the disclosure is exemplary, and merely division of logic functions. Other division manners may be adopted during practical implementation.

Figure 4:
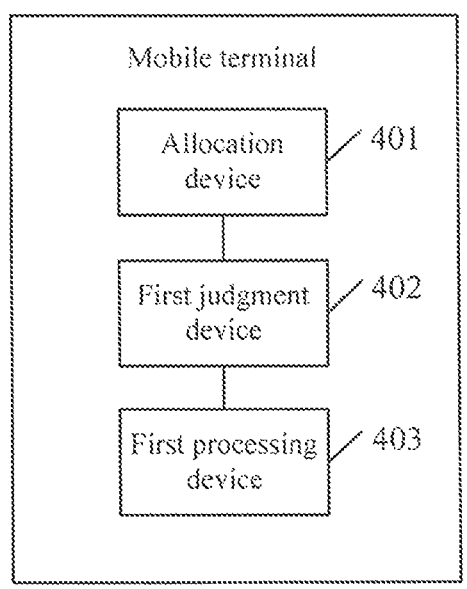
FIG. 4 illustrates a structure diagram of a mobile terminal according to an embodiment of the disclosure.

FIG. 4 illustrates a structure diagram of a mobile terminal according to an embodiment of the disclosure. As illustrated in FIG. 4, the mobile terminal may include an allocation device 401, a first judgment device 402 and a first processing device 403.

The allocation device 401 is configured to, when a first hot APP is launched, allocate a first dedicated CPU resource and a first dedicated memory resource to the first hot APP. The first hot APP may be any APP in a hot APP set.

The first judgment device 402 is configured to judge whether a duration of the first hot APP running in a background state reaches a preset duration.

The first processing device 403 is configured to, when the judgment result of the first judgment device is yes, release the first dedicated CPU resource and the first dedicated memory resource allocated to the first hot APP, and allocate a common CPU resource and a common memory resource to the first hot APP.

Details of the mobile terminal as illustrated in FIG. 4 may be seen from the method embodiment as illustrated in FIG. 1, and will not be elaborated.

By implementing the method in FIG. 4, CPU resources and memory resources can be flexibly utilized, thereby improving the utilization efficiency of the CPU resources and the memory resources.

Figure 5:
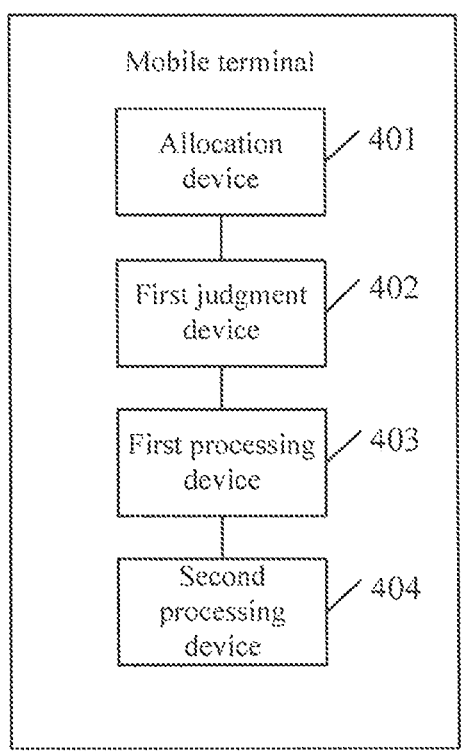
FIG. 5 illustrates a structure diagram of another mobile terminal according to an embodiment of the disclosure.

FIG. 5 illustrates a structure diagram of another mobile terminal according to an embodiment of the disclosure. As illustrated in FIG. 5, the mobile terminal may include an allocation device 401, a first judgment device 402, a first processing device 403 and a second processing device 404.

The second preceding device 404 is configured to, when the first hot APP is switched from running in the background state to running in the foreground state, and the common CPU resource and the common memory resource have been allocated to the first hot APP release the common CPU resource and the common memory resource allocated to the first hot APP, and allocate the first dedicated CPU resource and the first dedicated memory resource to the first hot APP.

Herein, details of the allocation device 401, the first judgment device 402 and the first processing device 403 may be seen from relevant descriptions of the embodiment as illustrated in FIG. 4, and will not be elaborated herein.

By implementing the mobile terminal as illustrated in FIG. 5, a dedicated CPU resource and a dedicated memory resource can still be allocated to a hot APP when the hot APP is switched from the background to the foreground, thereby ensuring the use experience of the hot APP.

Figure 6:
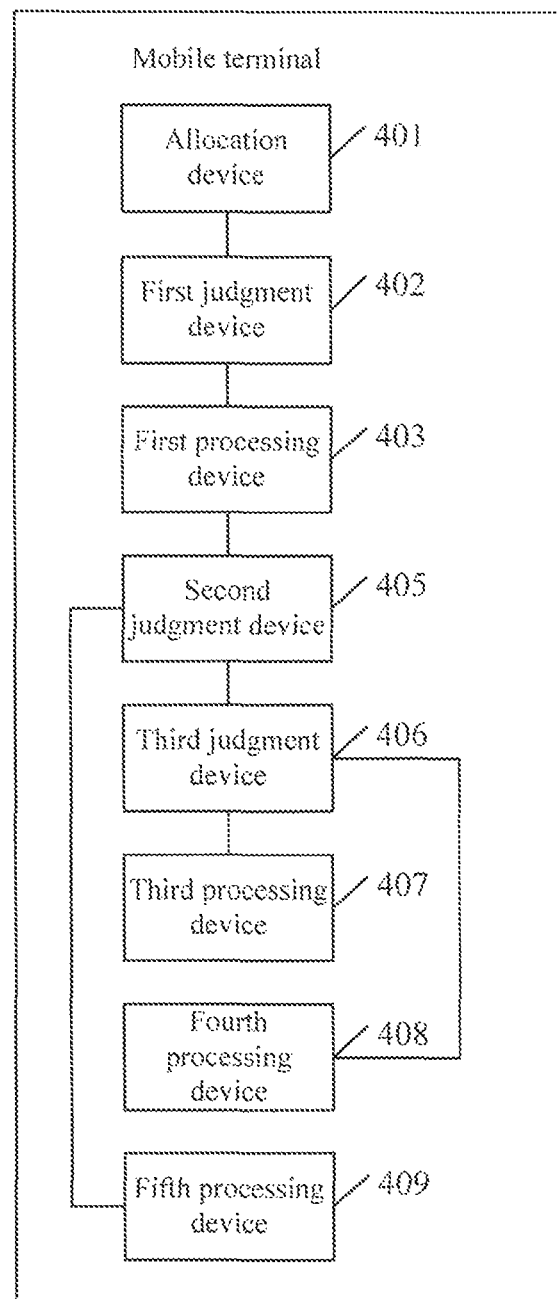
FIG. 6 illustrates a structure diagram of another mobile terminal according to an embodiment of the disclosure.

FIG. 6 is a structure diagram illustrating another mobile terminal according to an embodiment of the disclosure. As illustrated in FIG. 6, the mobile terminal may include an allocation device 401, a first judgment device 402, a first processing device 403, a second judgment device 405, a third judgment device 406, a third processing device 407, a fourth processing device 408 and a fifth processing device 409.

The second judgment device 405 is configured to, when the first hot APP is switched from running in the background state to running in the foreground state, and the common CPU resource and the common memory resource have been allocated to the first hot APP, judge whether the number of hot APPs running in the foreground state reaches a preset threshold.

The third judgment device 406 is configured to, when the judgment result of the second judgment device 405 is yes, judge whether a priority of the first hot APP is higher than a priority of a second hot APP. The second hot APP may be any APP in the hot APP set running in the foreground state.

Herein, the priority of the first hot APP is determined by a historic cumulative launching count and a historic cumulative usage duration of the first APP; or, the priority of the first hot APP is determined by user evaluation for the first APP.

The third processing device 407 is configured to, when the judgment result of the third judgment device 406 is yes, release a second dedicated CPU resource and a second dedicated memory resource allocated to the second hot APP, release the common CPU resource and the common memory resource allocated to the first hot APP, and allocate the second dedicated CPU resource and the second dedicated memory resource to the first hot APP.

The fourth processing device 408 is configured to, when the judgment result of the third judgment device 406 is no, continue to allocate the common CPU resource and the common memory resource to the first hot APP.

The fifth processing device 409 is further configured to, when the judgment result of the second judgment device 405 is no, release the common CPU resource and the common memory resource allocated to the first hot APP, and allocate the first dedicated CPU resource and the first dedicated memory resource to the first hot APP.

Herein, details of the allocation device 401, the first judgment device 402 and the first processing device 403 may be seen from relevant descriptions of the embodiment as illustrated in FIG. 4, and will not be elaborated herein.

By implementing the mobile terminal as illustrated in FIG. 6, when multiple hot APPs are to be launched, dedicated resources may be allocated to a hot APP having the highest priority, so as to ensure that the use experience of the hot APP having the highest priority is best.

Figure 7:
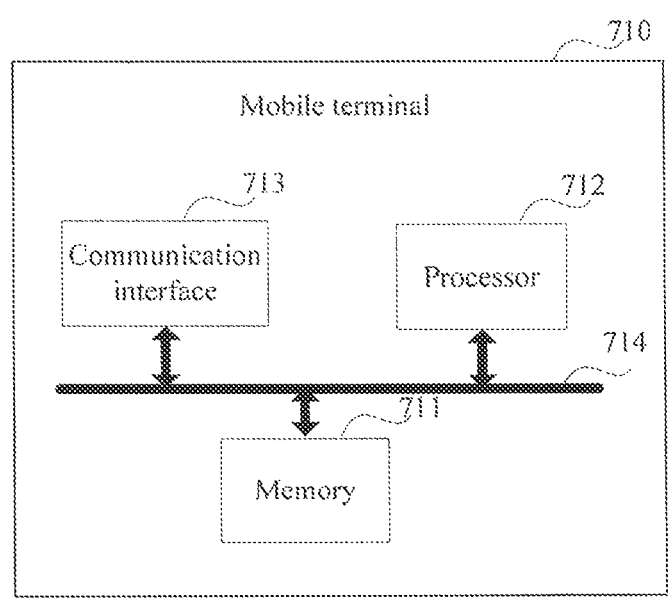
FIG. 7 illustrates a structure diagram of yet another mobile terminal according to embodiment of the disclosure.

FIG. 7 is a structure diagram illustrating yet another mobile terminal according to an embodiment of the disclosure. As illustrated in FIG. 7, the mobile terminal 710 includes: a processor 712, a communication interface 713 and a memory 711. Alternatively, the mobile terminal 710 may further include a bus 714, and the communication interface 713, the processor 712 and the memory 711 may be connected with each other through the bus 714. The bus 714 may be a Peripheral Component Interconnect (PCI) bus or an Extended industry Standard Architecture (EISA) bus. The bus 714 may be classified into address bus, data bus, control bus and the like. For convenience of expression, in FIG. 7, the bus is expressed by using only one heavy line, but this does not indicate that there is only one bus or buses of one type.

Figure 8:
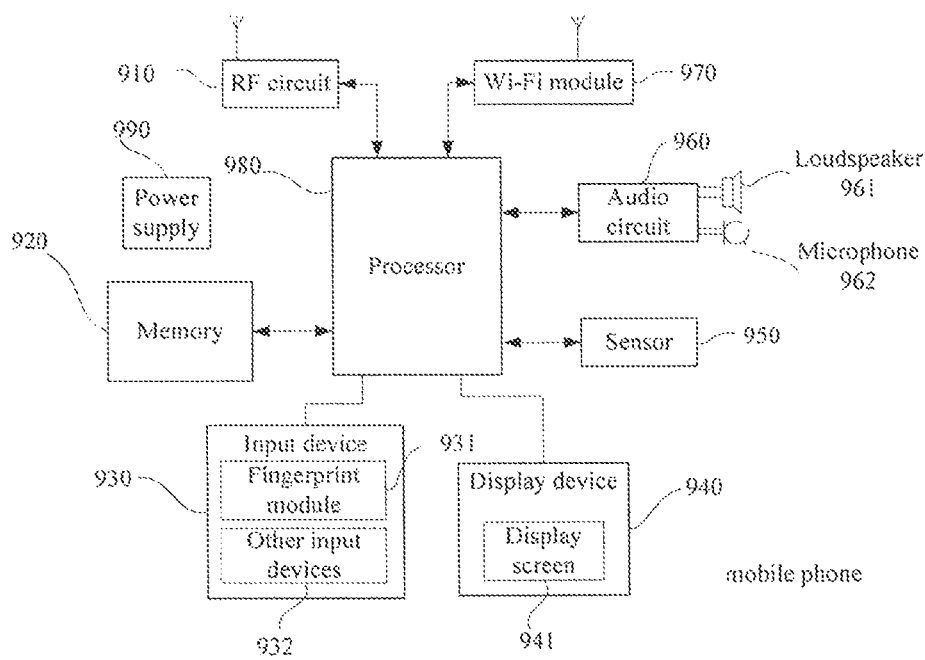
FIG. 8 illustrates a structure diagram of yet another mobile terminal according to an embodiment of the disclosure.

An embodiment of the disclosure provides yet another mobile terminal. FIG. 8 illustrates a structure diagram of yet another mobile terminal according to an embodiment of the disclosure. For convenience of description, only pasts associated with the embodiment of the disclosure are illustrated. Specific technical details that are not disclosed may be seen from parts of the method in the embodiments of the disclosure. The mobile terminal may be any terminal device including a mobile phone, a tablet computer, a Personal Digital Assistant (PDA), a Point of Sales (POS) and an on-board computer. The following description is given by taking a mobile phone as an example of the mobile terminal.

FIG. 8 illustrates a partial structure diagram of the mobile phone related to a mobile terminal according to an embodiment of the disclosure. The mobile phone includes: a Radio Frequency (RF) circuit 910, a memory 920, an input device 930, a display device 940, a sensor 950, an audio circuit 960, a Wireless Fidelity (WiFi) module 970, a processor 980, a power supply 990, and other parts. A person skilled in the art may understand that the structure of the mobile phone illustrated in FIG. 8 is not limitative to the mobile phone, and the mobile phone may include parts more or fewer than those illustrated in the figure, or combine some parts, or have different part arrangements.

Each component of the mobile phone will be specifically introduced below in conjunction with FIG. 8.

The RF circuit 910 may be configured to receive and transmit information. Usually, the RF circuit 910 includes, but is not limited to, an antenna, at least one amplifier, a transceiver, a coupler, a LOW Noise Amplifier (LNA), a duplexer, etc. In addition, the RF circuit 910 may further communicate with other devices via wireless communication and a network. The wireless communication may be performed by using any communication standard or protocol, including, but not limited to, Global System of Mobile communication (GSM), General Packet Radio Service (GPRS), Code Division Multiple Access (CDMA), Wideband Code Division Multiple Access (WCDMA), Long Term Evolution (LTE), E-mail, Short Messaging Service (SMS), etc.

The memory 920 may be configured to store a software program and a module, and the processor 980 executes various functional APPs and data processing of the mobile phone by running the software programs and the modules stored in the memory 920. The memory 920 may mainly include a storage program region and a storage data region, the storage program region may store an operation system, an APP required for at least one function (a program for releasing a dedicated memory resource), etc; and the storage data region may store data (such as a preset duration) created according to use of the mobile phone. In addition, the memory 920 may include a high-speed Random Access Memory (RAM), and may further include a non-volatile memory such as a disk storage device, a flash device, or other non-volatile solid storage devices.

The input device 930 may be configured to receive input digital or character information and generate key signal input associated with user setting and function control of the mobile phone. Specifically, the input device 930 may include a fingerprint recognition module 931 and other input devices 932. The fingerprint recognition module 931 may collect fingerprint data of a user. The input device 930 may further include, in addition to the fingerprint recognition module 931, other input devices 932. Specifically, the other input devices 932 may include, but are not limited to, one or more of a touch screen, a physical keyboard, function keys (such as a volume control key and a switch key), a track ball, a mouse and an operating rod and the like.

The display device 940 may be configured to display information input by the user or information provided for the user or various menus of the mobile phone. The display device 940 may include a display screen 941, and alternatively, the display screen 941 may be configured in a form of a liquid Crystal Display (LCD), an Organic Light-Emitting Diode (OLED), etc. Although, the fingerprint recognition module 931 and the display screen 941 implement input of the mobile phone and input functions as two independent parts in FIG. 8, the fingerprint recognition module 931 and the display screen 941 may be integrated to implement the input of the mobile phone and the input functions in some embodiments.

The mobile phone may further include at least one sensor 950 such as a light sensor, a motion sensor and other sensors. Specifically, the light sensor may include an ambient light sensor and a proximity sensor, the ambient light sensor may adjust the luminance of the display screen 941 according to the brightness of ambient light, and the proximity sensor may close the display screen 941 and/or backlight. As one type of the motion sensors, an accelerometer sensor may detect the magnitude of an accelerated speed in each direction (generally, three-axis), the size and direction of a gravity may be detected while resting, and the accelerometer sensor may be configured to identify an APP of a mobile phone gesture (e.g., horizontal and vertical screen switching, relevant games, and magnetometer attitude calibration), and vibration identification relevant functions (e.g., pedometer and knocking). Other sensors such as a gyroscope sensor, a barometer sensor, a hygrometer sensor, a thermometer sensor and an infrared sensor configurable for the mobile phone will not be elaborated herein.

The audio circuit 960, a loudspeaker 961 and a microphone 962 may provide an audio interface between the user and the mobile phone. The audio circuit 960 may transmit an electric signal converted from the received audio data to the loudspeaker 961, and the loudspeaker 961 converts the electric signal into a sound signal for playing. Besides, the microphone 962 converts a collected sound signal into an electric signal, the audio circuit 960 converts the received electric signal into audio data and then outputs the audio data to the audio data playing processor 980 for processing, the audio data is transmitted to another mobile phone via the RF circuit 910, or the audio data is output to the memory 920 for further processing.

Wi-Fi is a short-range wireless transmission technology. The mobile phone may assist the user in E-mail receiving and sending, webpage browsing, access to streaming media and the like by means of the Wi-Fi module 970, and provides wireless wideband internet access for the user. Although FIG. 8 illustrates the Wi-Fi module 970, it may be understood that the Wi-Fi module 570 is not a necessary component of the mobile phone and can be omitted without changing the essence of the disclosure as desired.

The processor 980 is a control center of the mobile phone, and is configured to connect all parts of the whole mobile phone by utilizing various interfaces and lines, to run or execute the software program and/or the module stored in the memory 920, and to call data stored in the memory 820 to execute various functions and processing data of the mobile phone, so as to wholly monitor the mobile phone. Alternatively, the processor 980 may include one or more processing units. For example, the processor 980 may be integrated with an application processor and a modulation-demodulation processor, the application processor mainly processes an operation system, a user interface, an application program and the like, and the modulation-demodulation processor mainly processes wireless communication. It may be understood that the modulation-demodulation processor may not be integrated into the processor 980.

The mobile phone may further include a power supply 990 (such as a battery) for supplying power to each component. For example, the power supply may be connected with the processor 980 logically via a power supply management system, so as to implement functions of charging, discharging and power consumption management by means of the power supply management system.

The mobile phone may further include a camera, a Bluetooth module and the like, which are not illustrated and will not be elaborated herein.

In the foregoing embodiments illustrated in FIG. 1 to FIG. 3, each operation flow may be implemented based on the structure of the mobile phone.

In the foregoing embodiments illustrated in FIG. 4 to FIG. 6, the function of each unit may be implemented based on the structure of the mobile phone.

An embodiment of the disclosure provides a computer storage medium. The computer storage medium may store a program, and the program executes some or all operations of any one hot APP resource allocation method in the above-mentioned method embodiment.

It is to be noted that for simple description, each of the abovementioned method embodiments is expressed as a series of action combinations. However, a person skilled in the art should know that the disclosure is not limited by the described action sequence. That is because some operations may be executed in other sequences or concurrently according to the disclosure. Secondly, a person skilled in the art should also know that in the embodiments described in the specification, involved actions and modules may not be necessary for the disclosure.

In the abovementioned embodiments, descriptions for each embodiment are emphasized respectively, and parts which are not elaborated in a certain embodiment may refer to relevant descriptions for other embodiments.

In some embodiments provided by the present application, it is to be understood that the disclosed apparatus may be implemented in another manner. For example, the apparatus embodiment described above is merely schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between the displayed or discussed components may be indirect coupling or communication connection, implemented through some interfaces, the device or the units, and may be electrical or adopt other forms.

The abovementioned units described as separate pasts may or may not be physically separated, and parts displayed as units may or may not be physical units, and namely may be located in the same place, or may be distributed among multiple network units. Part or all of the units may be selected to achieve the purpose of the solutions of the present embodiment according to a practical requirement.

In addition, each function unit in each embodiment of the disclosure may be integrated into a processing unit, each unit may also exist independently, or two or more units may be integrated into a unit. The abovementioned integrated unit may be implemented in a form of hardware, or may be implemented in a form of software function unit.

When being implemented in form of software function unit and sold or used as an independent product, the integrated unit may also be stored in a computer-readable storage medium. Based on such an understanding, the technical solutions of the disclosure substantially or parts making contributions to the conventional art may be embodied in form of software product, and the computer software product is stored in a storage medium, including a plurality of instructions configured to enable a computer device (which may be a personal computer, a server, a network device or the like) to execute all or part of the method in each embodiment of the disclosure. The abovementioned memory includes: various media capable of storing program codes such as a U disk, a Read-Only Memory (ROM), an RAM, a mobile hard disk, a magnetic disk or an optical disk.

A person of ordinary skill in the art can understand that all or some operations in each method in the abovementioned embodiments may be completed by instructing relevant hardware through a program, wherein the program may be stored in a computer-readable memory, and the memory may include: a flash disk, an ROM, an RAM, a magnetic disk or an optical disk.

The above is detailed description of the embodiments of the disclosure. The principle and implementation manner of the disclosure are elaborated herein by adopting a specific example. The description for the abovementioned embodiments are merely used to help understand the method of the disclosure and the core idea thereof. Meanwhile, a person of ordinary skill in the art will change a specific implementation manner and an application scope according to the idea of the disclosure. To sum up, the contents of the present specification should not be interpreted as limitations to the disclosure.

The invention claimed is:

1. A method for hot Application (APP) resource allocation, comprising:
    when a preset APP is launched, allocating a dedicated Central Processing Unit (CPU) resource and a dedicated memory resource to the preset APP;
    judging whether a duration of the preset APP running in a background state reaches a preset duration; and
    when the duration of the preset APP running in the background state reaches the preset duration, releasing the dedicated CPU resource and the dedicated memory resource allocated to the preset APP, and allocating a common CPU resource and a common memory resource to the preset APP,
    wherein the method further comprises:
    when the preset APP is switched from running in the background state to running in a foreground state, judging whether a number of other preset APPs running in the foreground state reaches a preset threshold; and
    when the number of the other preset APPs running in the foreground state does not reach the preset threshold, releasing the common CPU resource and the common memory resource allocated to the preset APP, and allocating the dedicated CPU resource and the dedicated memory resource to the preset APP.

2. The method according to claim 1, further comprising:
    when the number of the other preset APPs running in the foreground state reaches the preset threshold, judging whether a priority of the preset APP is higher than a priority of another preset APP of the other preset APPs; and
    when the priority of the preset APP is higher than the priority of the another preset APP, releasing another dedicated CPU resource and another dedicated memory resource allocated to the another preset APP, releasing the common CPU resource and the common memory resource allocated to the preset APP, and allocating the another dedicated CPU resource and the another dedicated memory resource to the preset APP; or when the priority of the preset APP is lower than the priority of the another preset APP, continuing to allocate the common CPU resource and the common memory resource to the preset APP.

3. The method according to claim 2, wherein the priority of the preset APP is determined by a historic cumulative launching count and a historic cumulative usage duration of the APP; or, the priority of the preset APP is determined by user evaluation for the APP.

4. A mobile terminal, comprising:
    a processor, a memory and a communication interface, the processor being connected to the memory and the communication interface, wherein
    the memory stores executable program codes, and the communication interface is used for wireless communication; and
    the processor is configured to call the executable program codes in the memory to execute a preset Application (APP) resource allocation method, the method comprising:
    when a preset APP is launched, allocating a dedicated Central Processing Unit (CPU) resource and a dedicated memory resource to the preset APP;
    judging whether a duration of the preset APP running in a background state reaches a preset duration; and
    when the duration of the preset APP running in the background state reaches the preset duration, releasing the dedicated CPU resource and the dedicated memory resource allocated to the preset APP, and allocating a common CPU resource and a common memory resource to the preset APP, wherein the method further comprises:

when the preset APP is switched from running in the background state to running in a foreground state, judging whether a number of other preset APPs running in the foreground state reaches a preset threshold; and when the number of the other preset APPs running in the foreground state does not reach the preset threshold, releasing the common CPU resource and the common memory resource allocated to the preset APP, and allocating the dedicated CPU resource and the dedicated memory resource to the preset APP.

5. The mobile terminal according to claim 4, wherein the method further comprises:

when the number of the other preset APPs running in the foreground state reaches the preset threshold, judging whether a priority of the preset APP is higher than a priority of another preset APP of the other preset APPs;

when the priority of the preset APP is higher than the priority of the another preset APP, releasing another dedicated CPU resource and another dedicated memory resource allocated to the another preset APP, releasing the common CPU resource and the common memory resource allocated to the preset APP, and allocating the another dedicated CPU resource and the another dedicated memory resource to the preset APP; or when the priority of the preset APP is lower than the priority of the another preset APP, continuing to allocate the common CPU resource and the common memory resource to the preset APP.

6. The mobile terminal according to claim 5, wherein the priority of the preset APP is determined by a historic cumulative launching count and a historic cumulative usage duration of the APP; or, the priority of the preset APP is determined by user evaluation for the APP.

7. A non-transitory computer readable storage medium, storing executable program codes, which, when executed by a processor, cause the processor to execute a preset Application (APP) resource allocation method, the method comprising:

when a preset APP is launched, allocating a dedicated Central Processing Unit (CPU) resource and a dedicated memory resource to the preset APP;

judging whether a duration of the preset APP running in a background state reaches a preset duration; and when the duration of the preset APP running in the background state reaches the preset duration, releasing the dedicated CPU resource and the dedicated memory resource allocated to the preset APP, and allocating a common CPU resource and a common memory resource to the preset APP, wherein the method further comprises:

when the preset APP is switched from running in the background state to running in a foreground state, judging whether a number of other preset APPs running in the foreground state reaches a preset threshold; and when the number of the other preset APPs running in the foreground state does not reach the preset threshold, releasing the common CPU resource and the common memory resource allocated to the preset APP, and allocating the dedicated CPU resource and the dedicated memory resource to the preset APP.

8. The non-transitory computer readable storage medium according to claim 7, wherein the method further comprises:

when the number of the other preset APPs running in the foreground state reaches the preset threshold, judging whether priority of the preset APP is higher than priority of another preset APP of the other APPs;

when the priority of the preset APP is higher than the priority of the another preset APP, releasing another dedicated CPU resource and another dedicated memory resource allocated to the another preset APP, releasing the common CPU resource and the common memory resource allocated to the preset APP, and allocating the another dedicated CPU resource and the another dedicated memory resource to the preset APP; and when the priority of the preset APP is lower than the priority of the another preset APP, continuing to allocate the common CPU resource and the common memory resource to the preset APP.

9. The non-transitory computer readable storage medium according to claim 8, wherein the priority of the preset APP is determined by a historic cumulative launching count and a historic cumulative usage duration of the APP; or, the priority of the preset APP is determined by user evaluation for the APP.

* * * * *